(12) United States Patent
Tanida et al.

(10) Patent No.: US 11,428,322 B2
(45) Date of Patent: Aug. 30, 2022

(54) SEALING APPARATUS

(71) Applicant: NOK CORPORATION, Tokyo (JP)

(72) Inventors: Masayuki Tanida, Fukushima (JP);
Masaru Syonai, Fukushima (JP);
Takuya Ito, Fukushima (JP); Kenya Yoshioka, Fukushima (JP)

(73) Assignee: NOK CORPORATION

( * ) Notice: Subject to any disclaimer, the term of this patent is extended or adjusted under 35 U.S.C. 154(b) by 77 days.

(21) Appl. No.: 16/968,128

(22) PCT Filed: Jun. 25, 2019

(86) PCT No.: PCT/JP2019/025121
§ 371 (c)(1),
(2) Date: Aug. 6, 2020

(87) PCT Pub. No.: WO2020/021940
PCT Pub. Date: Jan. 30, 2020

(65) Prior Publication Data
US 2021/0041024 A1 Feb. 11, 2021

(30) Foreign Application Priority Data
Jul. 24, 2018 (JP) .............................. JP2018-138139

(51) Int. Cl.
*F16J 15/3232* (2016.01)
*F16J 15/3284* (2016.01)
*F16C 33/78* (2006.01)

(52) U.S. Cl.
CPC ....... *F16J 15/3232* (2013.01); *F16J 15/3284* (2013.01); *F16C 33/7876* (2013.01); *F16C 2202/32* (2013.01)

(58) Field of Classification Search
CPC .... F16J 15/00; F16J 15/16; F16J 15/50; F16J 15/52; F16J 15/32; F16J 15/3204;
(Continued)

(56) References Cited

U.S. PATENT DOCUMENTS 4,981,303 A * 1/1991 Matsushima ........ F16J 15/3264
277/351
6,102,409 A * 8/2000 Furuyama ............ F16J 15/3228
277/559
(Continued)

FOREIGN PATENT DOCUMENTS

CN 102792076 A 11/2012
CN 104870870 A 8/2015
(Continued)

OTHER PUBLICATIONS

International Search Report (in English and Japanese) issued in PCT/JP2019/025121, dated Aug. 13, 2019; ISA/JP.
(Continued)

*Primary Examiner* — Nathan Cumar
(74) *Attorney, Agent, or Firm* — Harness, Dickey & Pierce, P.L.C.

(57) ABSTRACT

A sealing apparatus is provided that is capable of inhibiting a degradation in electrical conductivity performance. The sealing apparatus includes an outer seal part and an inner seal part, and conductive grease housed in a space. An outer elastic body part of the outer seal part is formed from an elastic body having electrical conductivity and includes a dust lip, a conduction lip, and a gasket part. At an annular fitting surface, the inner seal part is attached to the outer seal part. An inner elastic body part of the inner seal part is formed from an elastic body having electrical conductivity and includes a grease lip. The outer seal part has a spring that is put on an outer periphery side of the conduction lip to press the conduction lip against an inner peripheral member.

5 Claims, 3 Drawing Sheets

(58) Field of Classification Search
CPC .... F16J 15/3212; F16J 15/3216; F16J 15/322; F16J 15/3232; F16J 15/3268; F16J 15/3284; F16C 33/00; F16C 33/7873; F16C 33/7876
USPC ........................................................ 277/562
See application file for complete search history.

(56) References Cited

U.S. PATENT DOCUMENTS

| | | | |
|---|---|---|---|
| 2012/0286479 | A1 | 11/2012 | Ogishi et al. |
| 2014/0203514 | A1* | 7/2014 | Colineau ............. F16J 15/3232 277/353 |
| 2015/0316151 | A1 | 11/2015 | Suzuki |
| 2018/0058587 | A1 | 3/2018 | Yoshimura et al. |

FOREIGN PATENT DOCUMENTS

| | | |
|---|---|---|
| CN | 105840832 A | 8/2016 |
| CN | 107532721 A | 1/2018 |
| CN | 207297884 U | 5/2018 |
| JP | H0680956 U | 11/1994 |
| JP | H11-0218229 A | 8/1999 |
| JP | 2000-244180 A | 9/2000 |
| JP | 2003-185028 A | 7/2003 |
| JP | 2014-142065 A | 8/2014 |
| JP | 2014-240676 A | 12/2014 |
| JP | 2015-207534 A | 11/2015 |

OTHER PUBLICATIONS

English translation of Written Opinion of the International Search Authority and International Preliminary Report on Patentability Chapter I for corresponding international application No. PCT/JP2019/025121 dated Jan. 26, 2021 (8 pages).
Notice of Reasons for Refusal for corresponding Japanese Application No. 2020-532229 dated Jul. 14, 2021 with English translation (8 Pages).
Chinese Office Action issued for the corresponding Chinese Application No. 201980010611.5; dated Nov. 17, 2021 (total 16 pages).
Extended European Search Report for corresponding Application No. 19840792.6 dated Mar. 4, 2022 (9 Pages).
Second Chinese Office Action for corresponding Application No. 201980010611.5 dated Apr. 14, 2022 with English translation (17 Pages).
Third Chinese Office Action for corresponding Application No. 201980010611.5 dated Jun. 30, 2022 with English translation (16 Pages).

* cited by examiner

SEALING APPARATUS

CROSS REFERENCE TO RELATED APPLICATIONS

This application is a 371 U.S. National Phase of International Application No. PCT/JP2019/025121, filed Jun. 25, 2019, which claims priority to Japanese Patent Application No. 2018-138139, filed Jul. 24, 2018. The entire disclosures of the above applications are incorporated herein by reference.

BACKGROUND

Technical Field

The present invention relates to a sealing apparatus, and particularly relates to a sealing apparatus used for a motor and a vicinity of the motor.

Related Art

In recent years, the electrification of automobiles has been advancing and the development of electrified vehicles such as electric vehicles and fuel cell vehicles has been advancing. In such electrified vehicles, drive motors are used as power sources. Induced current generated by the drive motor can cause electromagnetic noise, affecting in-vehicle radios and wireless devices.

Thus, it is known that an automotive power transmission device (for example, see Japanese Patent Application Publication No. 2015-207534) discharges leakage current, a cause of high-frequency noise that is leaked from a drive motor, to a housing through a conductive path formed by a metallic brush having electrical conductivity. The metallic brush forms the conductive path between a shaft driven by the drive motor and the housing to provide grounding.

Unfortunately, in the automotive power transmission device as described above, a sliding movement between the shaft and the metallic brush generates metallic powder. This necessitates installing a cover for flying prevention to prevent the flying of the metallic powder generated from the metallic brush and securing a space for the installation of the cover.

In contrast, it is known that an oil seal for sealing between a through-hole in a housing grounded to a vehicle body and a rotating shaft of an electric motor is made of electrically conductive rubber to save space and an electromagnetic noise reduction device (for example, see Japanese Patent Application Publication No. 2000-244180) lets electromagnetic noise induced at the rotating shaft escape to the housing made of metal by electrically connecting the housing to the rotating shaft through the electrically conductive rubber.

Although the space is saved, the electromagnetic noise reduction device thus configured cannot let electromagnetic noise escape to the housing satisfactorily in some cases if the amount of time the electromagnetic noise reduction device is in service increases. In this way, the conventional electromagnetic noise reduction device has been required to have a configuration that prevents a degradation in electrical conductivity performance even if the electromagnetic noise reduction device has been in service for long time.

In view of the challenge described above, it is an object of the present invention to provide a sealing apparatus capable of inhibiting a degradation in electrical conductivity performance.

SUMMARY

A sealing apparatus according to the present invention, accomplished to attain the object described above, is configured to seal an annular space that is formed between an inner peripheral member and an outer peripheral member around an axis, the sealing apparatus including: an outer seal part formed annularly around the axis; and an inner seal part formed annularly around the axis, the inner seal part being attached to the outer seal part so as to form an annular space with the outer seal part around the axis, wherein the outer seal part includes: an outer reinforcing ring formed annularly around the axis; and an outer elastic body part that is attached to the outer reinforcing ring and that is formed annularly around the axis, the outer elastic body part being formed from an elastic body having electrical conductivity, the outer elastic body part including: a dust lip extending toward the axis, the dust lip being in contact with the inner peripheral member such that the inner peripheral member is slidable; a conduction lip being provided on an inner side of the dust lip and extending toward the axis, the conduction lip being in contact with the inner peripheral member such that the inner peripheral member is slidable; and a gasket part in contact with the outer peripheral member, wherein at an annular fitting surface formed around the axis, the inner seal part is attached to the outer elastic body part of the outer seal part from an inner peripheral side, the inner seal part including: an inner reinforcing ring formed annularly around the axis; and an inner elastic body part that is attached to the inner reinforcing ring and that is formed annularly around the axis, the inner elastic body part being formed from an elastic body having electrical conductivity, the inner elastic body part including a grease lip extending toward the axis and being in contact with the inner peripheral member such that the inner peripheral member is slidable, and wherein the outer seal part has a spring that is put on an outer periphery side of the conduction lip to press the conduction lip toward the inner periphery side.

In the sealing apparatus according to one aspect of the present invention, conductive grease is housed in the space formed by the outer seal part and the inner seal part.

The sealing apparatus according to one aspect of the present invention includes at least one of an outer peripheral protrusion projecting beyond the fitting surface to the outer periphery side and being disposed on the inner elastic body part and an inner peripheral protrusion projecting beyond the fitting surface to the inner periphery side and being disposed on the outer elastic body part.

In the sealing apparatus according to one aspect of the present invention, the outer peripheral protrusion is formed on at least part of the inner elastic body part, and the inner peripheral protrusion is formed on at least part of the gasket part.

In the sealing apparatus according to one aspect of the present invention, the conduction lip includes a conduction lip distal end portion that has a cross section formed in a wedge shape projecting convexly toward the axis.

Effects of Invention

The sealing apparatus according to the present invention is capable of inhibiting a degradation in electrical conductivity performance.

DETAILED DESCRIPTION

Hereinafter, an embodiment of the present invention is described with reference to the drawings.

Figure 1:
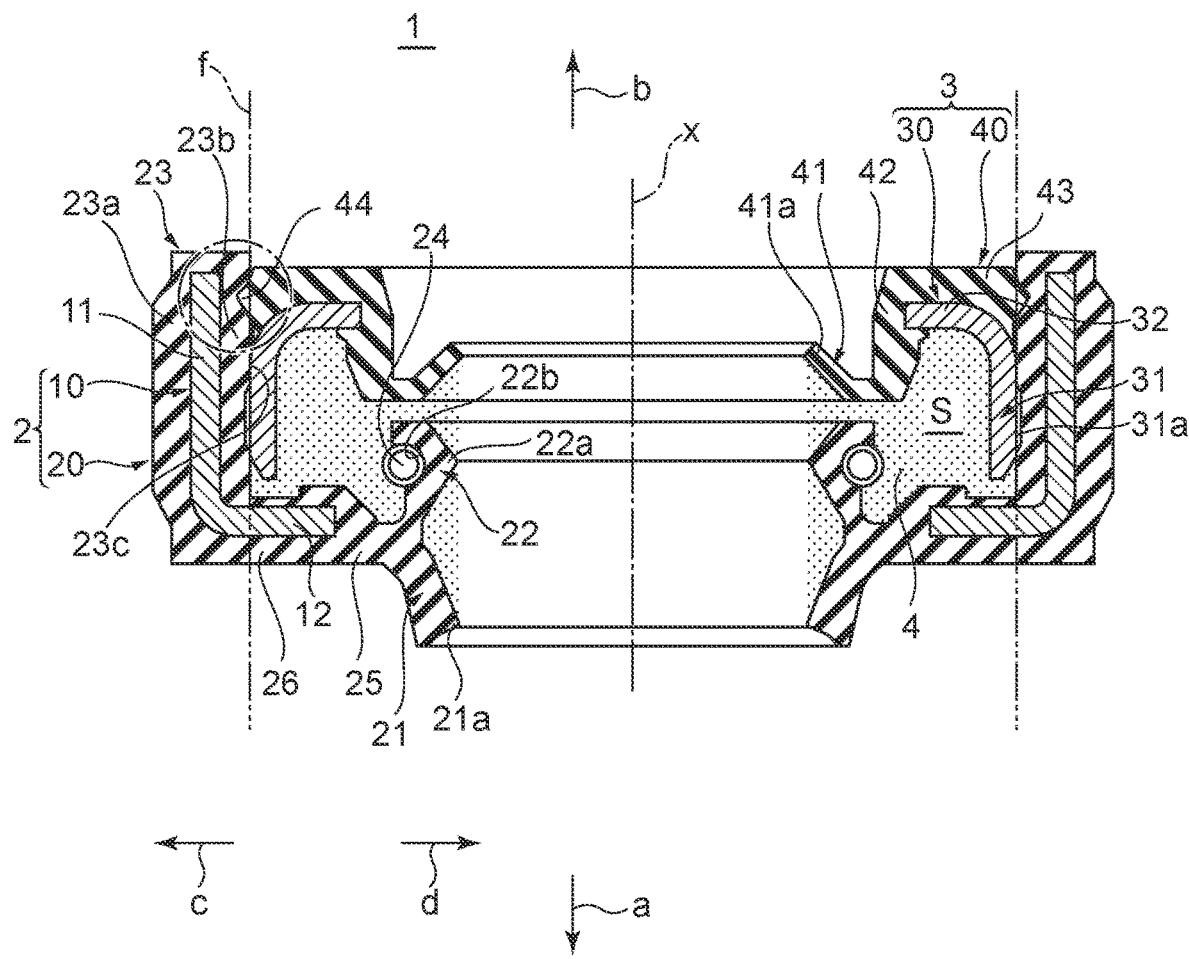
FIG. 1 is a cross-sectional view taken along an axis, illustrating a configuration of a sealing apparatus according to an embodiment of the present invention
Figure 2:
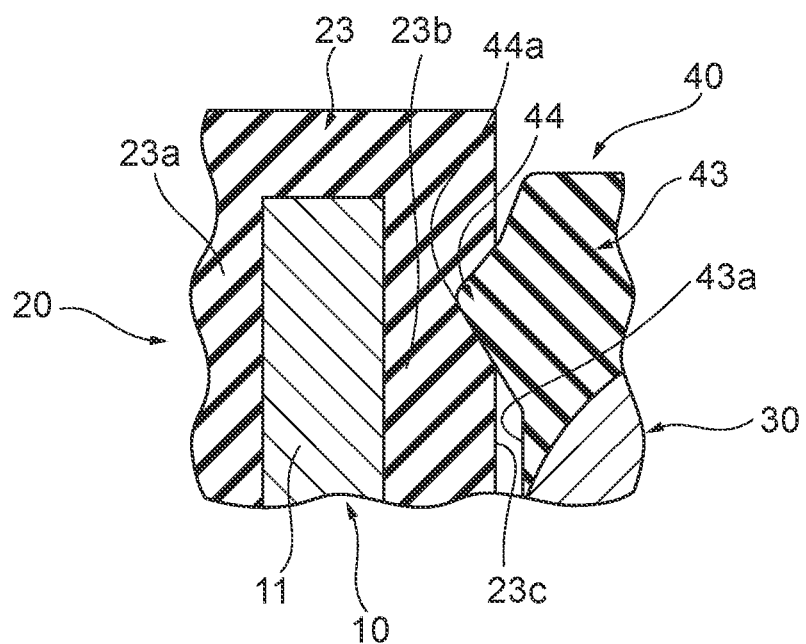
FIG. 2 is a partial enlarged cross-sectional view illustrating a configuration of a sealing apparatus according to an embodiment of the present invention

FIG. 1 is a cross-sectional view taken along an axis x, illustrating a configuration of a sealing apparatus 1 according to an embodiment of the present invention. FIG. 2 is a partial enlarged cross-sectional view illustrating the configuration of the sealing apparatus 1 according to the embodiment of the present invention. Hereinafter, a direction directed by an arrow a along the axis x represents an outer side, and a direction directed by an arrow b represents an inner side, for convenience of explanation. The outer side means an atmosphere side on which foreign matter such as sand and muddy water exist. The inner side means a side opposite the atmosphere side. In a direction perpendicular to the axis x (hereinafter also referred to as a "radial direction"), a direction away from the axis x represents an outer periphery side (a direction directed by an arrow c), and a direction approaching the axis x represents an inner periphery side (a direction directed by an arrow d).

The sealing apparatus 1 according to the embodiment of the present invention is configured to seal an annular space that is formed between an inner peripheral member and an outer peripheral member (both not illustrated) around the axis x. The inner peripheral member is, for example, an output shaft of an electric motor (not illustrated). The outer peripheral member is, for example, a housing (not illustrated) that houses the electric motor and that has a through-hole through which the output shaft of the electric motor passes. The inner peripheral member may be a member that reciprocates along the axis x.

As illustrated in FIG. 1, the sealing apparatus 1 includes an outer seal part 2 formed annularly around the axis x and an inner seal part 3 formed annularly around the axis x. The inner seal part 3 is attached to the outer seal part 2 so as to form an annular space S with the outer seal part 2 around the axis x. The sealing apparatus 1 has conductive grease 4 that is housed in the space S formed by the outer seal part 2 and the inner seal part 3.

The outer seal part 2 includes an outer reinforcing ring 10 formed annularly around the axis x and an outer elastic body part 20 that is attached to the outer reinforcing ring 10 and that is formed annularly around the axis x. The outer seal part 2 prevents entry of sand, muddy water, and other dust from the atmosphere side and prevents leakage of the conductive grease 4 housed in the space S to the atmosphere side.

The outer elastic body part 20 is formed from an elastic body having electrical conductivity and includes a dust lip 21 extending toward the axis x, a conduction lip 22 being provided on the inner side of the dust lip 21 and extending toward the axis x, and a gasket part 23 in contact with the outer peripheral member. The dust lip 21 is in contact with the inner peripheral member so that the inner peripheral member is slidable. The conduction lip 22 is in contact with the inner peripheral member so that the inner peripheral member is slidable.

At an annular fitting surface f formed around the axis x, the inner seal part 3 is attached to the outer elastic body part 20 of the outer seal part 2 from the inner peripheral side. The inner seal part 3 includes an inner reinforcing ring 30 formed annularly around the axis x and an inner elastic body part 40 that is attached to the inner reinforcing ring 30 and that is formed annularly around the axis x. When the sealing apparatus 1 is in a usage state, the inner seal part 3 prevents entry of grease and other substances from the inner side and prevents leakage of the conductive grease 4 housed in the space S to the inner side. The outer seal parts 2 and the inner seal part 3 are fitted onto each other while the inner seal part 3 is attached to the outer seal part 2 and thus the fitting surface f is a surface formed between portions of the outer seal parts 2 and the inner seal part 3 in contact with each other. The inner elastic body part 40 is formed from an elastic body having electrical conductivity and includes a grease lip 41 extending toward the axis x and being in contact with the inner peripheral member so that the inner peripheral member is slidable. The outer seal part 2 has a spring 24 that is put on an outer periphery side of the conduction lip 22 to press the conduction lip 22 against the inner peripheral member. Hereinafter, a configuration of the sealing apparatus 1 will be described in detail.

In the outer seal part 2, the outer reinforcing ring 10, as illustrated in FIG. 1, is an annular member centered about or substantially centered about the axis x and is made of metal. A shape of a cross section along the axis x (hereinafter also referred to simply as a "cross section") of the outer reinforcing ring 10 is an L shape or a substantially L shape. The outer reinforcing ring 10, for example, includes a cylindrical part 11 that is a cylindrical or substantially cylindrical portion extending in the direction of the axis x, and a disc part 12 that is a hollow disc-shaped portion extending toward the inner periphery side (the arrow d direction) from an end portion of the cylindrical part 11 on the outer (arrow a direction) side. The cylindrical part 11 is formed such that the sealing apparatus 1 is allowed to be fitted to an inner peripheral surface of the through-hole formed in the outer peripheral member (not illustrated). The cylindrical part 11 may be directly in contact with the inner peripheral surface of the through-hole to be able to be fitted to the inner peripheral surface of the through-hole, or may be in contact with the inner peripheral surface of the through-hole through a portion of the outer elastic body part 20 to be able to be fitted to the inner peripheral surface of the through-hole.

As illustrated in FIG. 1, the outer elastic body part 20 is attached to the outer reinforcing ring 10, and is integrally formed with the outer reinforcing ring 10 to cover the entire outer reinforcing ring 10 in the present embodiment. The outer elastic body part 20, as described above, includes the dust lip 21, the conduction lip 22 provided on the inner side of the dust lip 21, and the gasket part 23. The outer elastic body part 20 also includes an annular outer lip waist portion 25 and an outer cover part 26. The outer lip waist portion 25 is a portion positioned in a vicinity of an end portion on the inner periphery side of the disc part 12 of the outer reinforcing ring 10. The outer cover part 26 is a portion between the outer lip waist portion 25 and the gasket part 23 and is attached to the disc part 12 from the outer side and the inner side.

The dust lip 21 extends diagonally from the outer lip waist portion 25 to the outer side toward the axis x and has a shape that decreases in diameter as progress toward the outer side. A dust lip distal end portion 21a, a distal end portion of the dust lip 21, is formed so as to be in contact with a surface of the inner peripheral member on the outer periphery side so that the inner peripheral member is slidable when the sealing apparatus 1 is in a usage state in which the sealing apparatus 1 is attached in the space between the inner peripheral member and the outer peripheral member (hereinafter also referred to simply as a "usage state").

The conduction lip 22, which is disposed on the inner side of the dust lip 21, extends diagonally from the outer lip waist portion 25 to the inner side toward the axis x and has a shape that decreases in diameter as progress toward the inner side. A conduction lip distal end portion 22a, a distal end portion of the conduction lip 22, is an annular portion that has a cross section formed in a wedge shape projecting convexly toward the inner periphery side. The conduction lip distal end portion 22a is formed so as to be in contact with the surface of the inner peripheral member on the outer periphery side so that the inner peripheral member is slidable when the sealing apparatus 1 is in the usage state. A recess 22b, a part recessed to the inner periphery side is formed at a position facing away from the conduction lip distal end portion 22a on the outer periphery side of the conduction lip 22.

The gasket part 23 is attached to the cylindrical part 11 of the outer reinforcing ring 10 so as to surround the cylindrical part 11 from the outer periphery side and the inner periphery side. The gasket part 23 includes an outer peripheral gasket part 23a that is a portion put over the cylindrical part 11 from the outer periphery side and an inner peripheral gasket part 23b that is a portion put over the cylindrical part 11 from the inner periphery side. A thickness in the radial direction of the outer peripheral gasket part 23a is set so that, when the sealing apparatus 1 is press-fitted onto the inner peripheral surface of the outer peripheral member (the through-hole), the outer peripheral gasket part 23a is compressed between the through-hole and the cylindrical part 11 of the outer reinforcing ring 10 in the radial direction so that the outer peripheral gasket part 23a generates a fitting force of a predetermined magnitude in the radial direction. A thickness in the radial direction of the inner peripheral gasket part 23b is set so that, while the inner seal part 3 is fitted to the outer seal part 2, i.e., when the inner seal part 3 is press-fitted onto the inner peripheral gasket part 23b, the inner peripheral gasket part 23b is compressed between the cylindrical part 11 of the outer reinforcing ring 10 and the inner seal part 3 (the fitting surface f) in the radial direction so that the inner peripheral gasket part 23b generates a fitting force of a predetermined magnitude in the radial direction.

The spring 24 is fitted to the recess 22b formed in the conduction lip 22. The spring 24 is, for example, a coiled spring member made of metal and presses the conduction lip distal end portion 22a in a direction toward the axis x to apply a tensional force of a predetermined magnitude to the conduction lip distal end portion 22a against the inner peripheral member such that the conduction lip distal end portion 22a follows a displacement of the inner peripheral member. The spring 24 may be made of any of various materials, such as a resin, other than metal.

In the inner seal part 3, the inner reinforcing ring 30, as illustrated in FIG. 1, is an annular member centered about or substantially centered about the axis x and is made of metal. A shape of a cross section of the inner reinforcing ring 30 is an L shape or a substantially L shape. The inner reinforcing ring 30, for example, includes a cylindrical part 31 that is a cylindrical or substantially cylindrical portion extending in the direction of the axis x, and a disc part 32 that is a hollow disc-shaped portion extending toward the inner periphery side from an end portion of the cylindrical part 31 on the inner side. The cylindrical part 31 is formed such that the inner seal part 3 is fitted to and fixed to the outer seal part 2, as described above, and such that an outer peripheral surface 31a of the cylindrical part 31 is allowed to be fitted to an inner peripheral surface 23c of the inner peripheral gasket part 23b of the outer elastic body part 20 of the outer seal part 2. The outer peripheral surface 31a of the cylindrical part 31 of the inner reinforcing ring 30 and the inner peripheral surface 23c of the inner peripheral gasket part 23b are in contact with each other, and the fitting surface f is formed between the outer peripheral surface 31a and the inner peripheral surface 23c. A size of a diameter defined by the outer peripheral surface 31a of the cylindrical part 31 of the inner reinforcing ring 30 is set such that the inner peripheral gasket part 23b of the outer elastic body part 20 is compressed between the cylindrical part 31 and the cylindrical part 11 of the outer reinforcing ring 10 in the radial direction.

As illustrated in FIG. 1, the inner elastic body part 40 is attached to the inner reinforcing ring 30, and is integrally formed with the inner reinforcing ring 30 to partly cover the inner reinforcing ring 30 from the inner side and the inner periphery side in the present embodiment. The inner elastic body part 40, as described above, includes the grease lip 41. The inner elastic body part 40 also includes an annular inner lip waist portion 42 and an inner cover part 43. The inner lip waist portion 42 is a portion positioned in a vicinity of an end portion on the inner periphery side of the disc part 32 of the inner reinforcing ring 30. The inner cover part 43 is a portion covering the disc part 32 from the inner side and extending to a joint or a vicinity of the joint between the disc part 32 and the cylindrical part 31.

The grease lip 41 extends diagonally from a surface of the inner lip waist portion 42 on the inner periphery side to the inner side toward the axis x and has a shape that decreases in diameter as progress toward the inner side. A grease lip distal end portion 41a, a distal end portion of the grease lip 41, is formed so as to be in contact with the surface of the inner peripheral member on the outer periphery side so that the inner peripheral member is slidable when the sealing apparatus 1 is in the usage state.

As illustrated in FIGS. 1 and 2, the inner seal part 3 includes an outer peripheral protrusion 44 projecting beyond the fitting surface f to the outer periphery side and being disposed on the inner elastic body part 40. The outer peripheral protrusion 44 is formed on at least part of the inner elastic body part 40. Specifically, the outer peripheral protrusion 44, as illustrated in FIG. 2, is an annular portion that has a cross section formed in a wedge shape protruding from an outer peripheral end face (an outer peripheral surface 43a) of the inner cover part 43 of the inner elastic body part 40 toward the outer periphery side. The outer peripheral protrusion 44 extends in the shape of an endless annulation centered about or substantially centered about the axis x, protruding beyond the outer peripheral surface 31a of the cylindrical part 31 of the inner reinforcing ring 30 to the outer periphery side. In the present embodiment, the outer peripheral surface 43a of the inner cover part 43 is formed so as to be flush with or substantially flush with the outer peripheral surface 31a of the cylindrical part 31 of the inner reinforcing ring 30. The outer peripheral protrusion 44 protrudes entirely or substantially entirely beyond the outer peripheral surface 31a of the cylindrical part 31 to the outer periphery side. In other words, the outer peripheral protrusion 44 protrudes entirely or substantially entirely beyond the fitting surface f to the outer periphery side. The outer peripheral protrusion 44 may be formed such that at least a distal end 44a of the outer peripheral protrusion 44 protrudes beyond the fitting surface f to the outer periphery side.

The outer peripheral protrusion 44 may be formed in the shape of an endless annulation around the axis x as described above, may be formed annularly and intermittently around the axis x, or may be formed as at least one projection. Specifically, the outer peripheral protrusion 44 may be made up of a plurality of arc-shaped portions that are formed on a circumference of a circle centered about or substantially centered about the axis x at equal angle intervals around the axis x and that each have a cross section formed in a wedge shape protruding toward the outer periphery side, or may be made up of one such arc-shaped portion. The outer peripheral protrusion 44 may be made up of a plurality of conical portions that are formed at equal angle intervals around the axis x and that each protrude toward the outer periphery side, or may be made up of one such conical portion. The outer peripheral protrusion 44 is not limited in shape to these examples and may be made up of a portion or portions of another shape protruding toward the outer periphery side as described above. When the inner seal part 3 is attached to the outer seal part 2, the outer peripheral protrusion 44 firmly fits into the inner peripheral gasket part 23b from the inner periphery side.

The inner cover part 43 of the inner elastic body part 40 may be formed so as to also cover the outer peripheral surface 31a of the cylindrical part 31 of the inner reinforcing ring 30. In this case, the outer peripheral surface 43a of the inner cover part 43 of the inner seal part 3 is fitted to the inner peripheral gasket part 23b of the outer seal part 2, and the outer peripheral surface 43a of the inner cover part 43 forms the fitting surface f. In this case, the outer peripheral protrusion 44 may be formed on a part of the cylindrical part 31 on the outer periphery side.

The electrically conductive elastic body for the outer elastic body part 20 and the inner elastic body part 40 is, for example, electrically conductive rubber containing an electrically conductive filler such as a carbon black particle or metallic powder. Such electrically conductive rubber has relatively low electrical resistance.

The metal material for the outer reinforcing ring 10 and the inner reinforcing ring 30 is, for example, stainless steel or SPCC (a cold rolled steel sheet). The outer and the inner reinforcing rings 10 and 30 are manufactured by press working or forging, for example, and the outer and the inner elastic body parts 20 and 40 are each molded with a mold by cross-linking (vulcanization). During the cross-linking, the outer and the inner reinforcing rings 10 and 30 are each placed in the mold, the outer and the inner elastic body parts 20 and 40 are bonded to the outer and the inner reinforcing rings 10 and 30 respectively by cross-linking bonding, and the outer and the inner elastic body parts 20 and 40 are integrally molded with the outer and the inner reinforcing rings 10 and 30 respectively.

The sealing apparatus 1 is assembled by attaching the inner seal part 3 to the outer seal part 2 from the inner side and the inner periphery side. In the sealing apparatus 1, the space S whose the outer side, the inner side, and the outer periphery side are closed is formed between the outer and the inner seal parts 2 and 3. The conductive grease 4 is housed in the space S. This ensures stable lubrication between the conduction lip distal end portion 22a and the surface of the inner peripheral member on the outer periphery side even though the spring 24 presses the conduction lip 22 against the inner peripheral member when the sealing apparatus 1 is in the usage state. This also maintains a state in which the conductive grease 4 is applied to areas of the dust lip 21 and the grease lip 41 that are in contact with the inner peripheral member and thus ensures stable lubrication between each of the dust lip 21 and the grease lip 41 and the inner peripheral member.

In the sealing apparatus 1, the outer peripheral protrusion 44 fits into the inner peripheral gasket part 23b from the inner peripheral side as described above, and thus the outer peripheral protrusion 44 is in intimate contact with the inner peripheral gasket part 23b with an increased degree of adhesion. As a result, a stable conductive path with low resistance is formed between the inner elastic body part 40 of the inner seal part 3 and the outer elastic body part 20 of the outer seal part 2.

When the sealing apparatus 1 is in the usage state, the dust lip 21 and the conduction lip 22 are in contact with the surface of the inner peripheral member on the outer periphery side. This allows the dust lip 21 and the conduction lip 22 to prevent entry of sand, muddy water, and other dust from the atmosphere side and prevent leakage of the conductive grease 4 housed in the space S to the atmosphere side, as well as enables the formation of a conductive path from the inner peripheral member to the outer elastic body part 20.

When the sealing apparatus 1 is in the usage state, the grease lip 41 is in contact with the surface of the inner peripheral member on the outer periphery side. This allows the grease lip 41 to prevent entry of lubricant and other substances from the inner side and prevent leakage of the conductive grease 4 housed in the space S to the inner side, as well as enables the formation of a conductive path from the inner peripheral member to the inner elastic body part 40.

In the sealing apparatus 1, the conduction lip 22 is pressed by the tensional force of the spring 24 against the outer peripheral surface of the inner peripheral member. This helps stabilize a state of contact, i.e., a state of electrical conduction, between the conduction lip 22 and the outer peripheral surface of the inner peripheral member and stably reduce the possibility of noise generation. Further, even after a long-time use of the sealing apparatus 1, the tensional force of the spring 24 enables the sealing apparatus 1 to maintain a state in which the conduction lip 22 is pressed firmly against the outer peripheral surface of the inner peripheral member. This helps maintain the state of electrical conduction from start of use of the sealing apparatus 1, stably prevent noise generation, and inhibit a degradation in electrical conductivity performance.

The sealing apparatus 1 includes the outer elastic body part 20 and the inner elastic body part 40 that are formed from an elastic body having electrical conductivity. This allows the sealing apparatus 1 in the usage state to ensure electrical conduction between the inner peripheral member and the outer peripheral member through the outer and the inner elastic body parts 20 and 40. Specifically, the sealing apparatus 1 in the usage state can ensure three conductive paths described below. The first conductive path is a path linking the inner peripheral member to the outer peripheral member via the dust lip 21, the outer lip waist portion 25, the outer cover part 26, and the gasket part 23. The second conductive path is a path linking the inner peripheral member to the outer peripheral member via the conduction lip 22, the outer lip waist portion 25, the outer cover part 26, and the gasket part 23. The third conductive path is a path linking the inner peripheral member to the outer peripheral member via the grease lip 41, the inner lip waist portion 42, the inner cover part 43, the outer peripheral protrusion 44, and the gasket part 23.

This enables the sealing apparatus to discharge leakage current generated at the electric motor or another source from the inner peripheral member (the output shaft) to the outer peripheral member (the casing) through the first conductive path, the second conductive path, and the third conductive path described above and prevent noise generation. In the third conductive path in particular, the outer peripheral protrusion 44 firmly fits into the gasket part 23 from the inner peripheral side and thus contributes to an increase in contact surface pressure between the outer peripheral protrusion 44 and the gasket part 23 and an increase in actual contact area between the outer peripheral protrusion 44 and the gasket part 23. This provides an improvement in electrical conductivity performance.

Although the sealing apparatus 1 according to the embodiment of the present invention has been described above, a sealing apparatus according to the present invention is not limited to the sealing apparatus 1 described above, and includes any modes falling within the scope of the concept and claims of the present invention. Respective configurations may be appropriately selectively combined to solve at least part of the above-described problems and achieve at least part of the above-described effects. For example, in the above-described embodiment, the shape, material, arrangement, size and the like of each component can be appropriately changed according to a specific use mode of the present invention.

For instance, the sealing apparatus 1 may include an inner peripheral protrusion 27 projecting beyond the fitting surface f to the inner periphery side and being disposed on the gasket part 23 in place of or together with the outer peripheral protrusion 44. The inner peripheral protrusion 27 is similar in shape to the outer peripheral protrusion 44 and is formed on at least part of the inner peripheral gasket part 23b.

Figure 3:
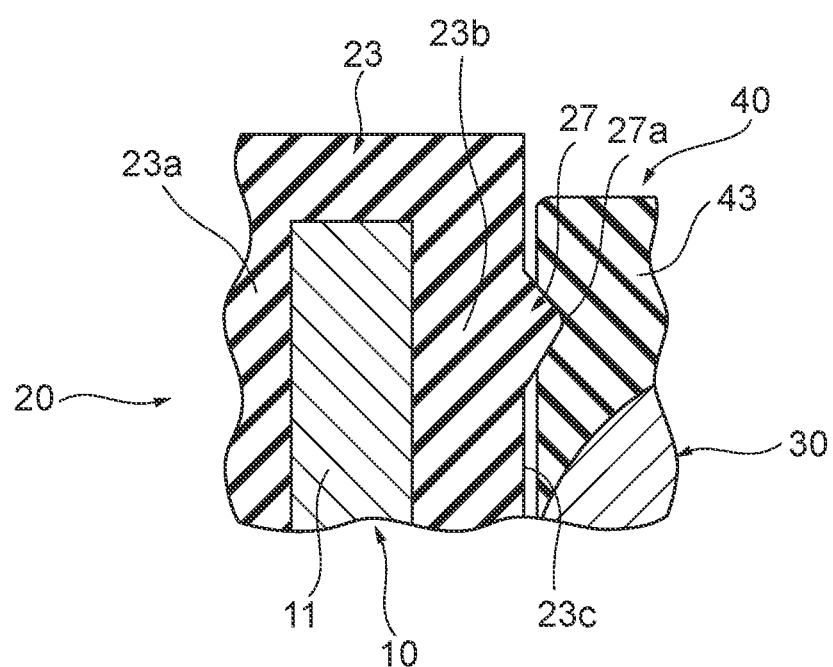
FIG. 3 is a partial enlarged cross-sectional view illustrating a configuration of a sealing apparatus according to a modification example of the present invention

As illustrated in FIG. 3, the inner peripheral protrusion 27 is, for example, a portion that extends in the shape of an endless annulation centered about or substantially centered about the axis x and that has a cross section formed in a wedge shape protruding from the inner peripheral surface 23c of the inner peripheral gasket part 23b of the outer elastic body part 20 toward the inner periphery side. The inner peripheral protrusion 27 protrudes entirely or substantially entirely beyond the inner peripheral surface 23c of the inner peripheral gasket part 23b to the inner periphery side. In other words, the inner peripheral protrusion 27 protrudes entirely or substantially entirely beyond the fitting surface f to the inner periphery side. The inner peripheral protrusion 27 is formed at a place that allows the inner peripheral protrusion 27 on the outer periphery side to firmly fit into the inner elastic body part 40 of the inner seal part 3. In a similar way to the outer peripheral protrusion 44, the inner peripheral protrusion 27 may be formed such that at least a distal end 27a of the inner peripheral protrusion 27 protrudes beyond the fitting surface f to the inner periphery side. The inner peripheral protrusion 27 may be formed in the shape of an endless annulation around the axis x continuously and uninterruptedly as described above, may be formed partly annularly around the axis x, or may be formed as at least one projection. When the inner seal part 3 is attached to the outer seal part 2, the inner peripheral protrusion 27 firmly fits into the inner cover part 43 of the inner elastic body part 40 from the outer peripheral side.

The invention claimed is:

1. A sealing apparatus configured to seal an annular space that is formed between an inner peripheral member and an outer peripheral member around an axis, the sealing apparatus comprising:
   an outer seal formed annularly around the axis; and
   an inner seal formed annularly around the axis, the inner seal being attached to the outer seal so as to form an annular space with the outer seal around the axis,
   wherein the outer seal includes:
   an outer reinforcing ring formed annularly around the axis; and
   an outer elastic body that is attached to the outer reinforcing ring and that is formed annularly around the axis, the outer elastic body being formed from an elastic body having electrical conductivity, the outer elastic body including:
   a dust lip extending toward the axis, the dust lip being in contact with the inner peripheral member such that the inner peripheral member is slidable;
   a conduction lip being provided on an inner side of the dust lip and extending toward the axis, the conduction lip being in contact with the inner peripheral member such that the inner peripheral member is slidable; and
   a gasket in contact with the outer peripheral member,
   wherein, at an annular fitting surface formed around the axis, the inner seal is attached to the outer elastic body of the outer seal from an inner peripheral side, the inner seal including:
   an inner reinforcing ring formed annularly around the axis; and
   an inner elastic body that is attached to the inner reinforcing ring and that is formed annularly around the axis, the inner elastic body being formed from an elastic body having electrical conductivity, the inner elastic body including a grease lip extending toward the axis and being in contact with the inner peripheral member such that the inner peripheral member is slidable,
   wherein the outer seal has a spring on an outer periphery side of the conduction lip and configured to press the conduction lip toward the inner periphery side, and
   the outer elastic body and the inner elastic body are in direct contact with each other via a protrusion received in a corresponding recess.

2. The sealing apparatus according to claim 1, wherein conductive grease is housed in the space formed by the outer seal and the inner seal.

3. The sealing apparatus according to claim 1, wherein the sealing apparatus includes at least one of an outer peripheral protrusion projecting beyond the fitting surface to the outer periphery side and being disposed on the inner elastic body and an inner peripheral protrusion projecting beyond the fitting surface to the inner periphery side and being disposed on the outer elastic body.

4. The sealing apparatus according to claim 3, wherein the outer peripheral protrusion is formed on at least part of the inner elastic body, and
   the inner peripheral protrusion is formed on at least part of the gasket.

5. The sealing apparatus according to claim 1, wherein the conduction lip includes a conduction lip distal end portion that has a cross section formed in a wedge shape projecting convexly toward the axis.

* * * * *